Oct. 15, 1935.  C. E. HATHORN  2,017,207
STRUT FAIRING BRACKET
Filed Feb. 15, 1933
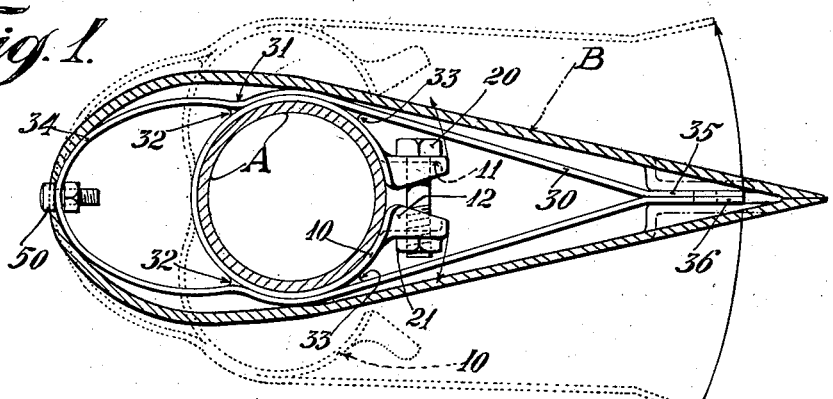
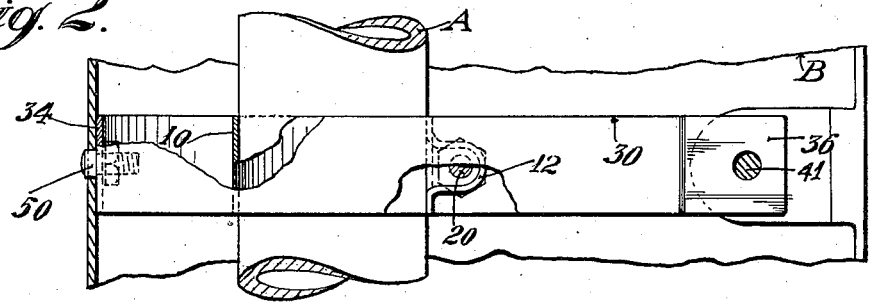
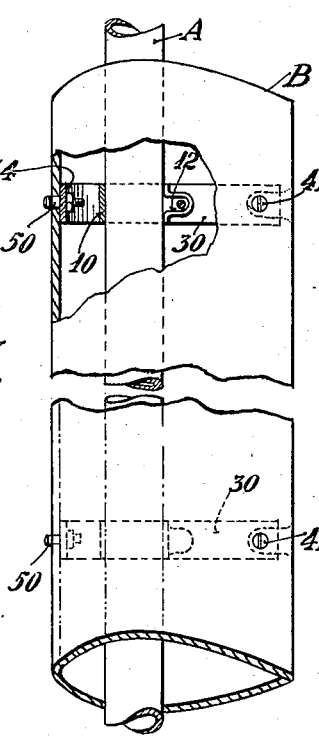
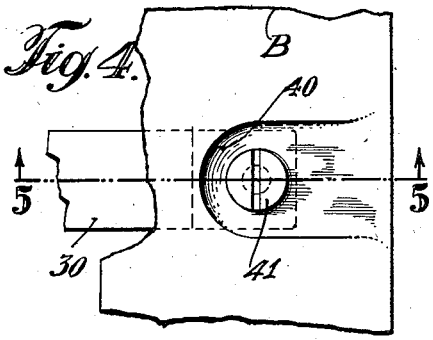
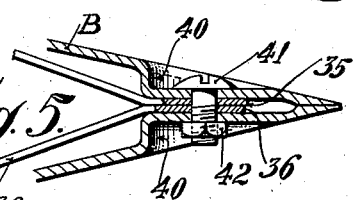
INVENTOR.
Charles E. Hathorn
BY
ATTORNEY.

Patented Oct. 15, 1935

2,017,207

UNITED STATES PATENT OFFICE 2,017,207

STRUT FAIRING BRACKET

Charles E. Hathorn, Hempstead, N. Y., assignor to Curtiss Aeroplane & Motor Company, Inc., a corporation of New York Application February 15, 1933, Serial No. 656,928

11 Claims. (Cl. 244—31)

My invention relates to aircraft construction and more particularly to brackets for use in fairing the tubular struts extending between the different parts of an airplane.

Previous types of brackets used for this purpose have not proven satisfactory either for the reason that the cost of manufacture of such devices from sheet metal stock has been prohibitive or due to the actual failure of structural parts of the bracket itself whenever attempts have been made to manufacture the brackets from any other material with any degree of economy.

It is therefore an object of the present invention to provide a strut fairing bracket which has sufficient rigidity and strength to support and maintain the location of the fairing with respect to the part of the airplane to which it is secured.

Another object of the invention is to provide such a bracket which is light in weight consistent with the requirements of aircraft construction and which is so constructed as to prevent the fairing from rotating about a tubular strut extending between different parts of the airplane.

A further object of the present invention resides in the provision of a strut fairing bracket constructed from sheet metal material which lends support to the fairing material at different points throughout the length of the bracket and which may be manufactured and assembled simply and economically by the use of standard parts which may be had at low cost.

With these and other objects in view, as will appear from reading the following specification, my invention consists of the novel features of construction and arrangement of parts hereinafter fully described, claimed, and illustrated in the accompanying drawing forming parts of this specification, in which Fig. 1 is a plan view of my improved bracket showing the same as clamped to a tubular strut in operative position with an outline of the fairing attached and also in dotted lines as sprung apart for removing the bracket from the strut or for the purpose of assembling the parts.

Fig. 2 is a view in elevation of the bracket as shown in Fig. 1 partly cut away to show the construction of the bracket and the manner of clamping the same to the strut.

Fig. 3 shows a fragmentary view in elevation of a number of my improved brackets as used for supporting the fairing for a tubular strut.

Fig. 4 is a detail view showing the combined manner of securing the ends of the bracket together and of fastening the trailing edge of the fairing to the ends of the bracket.

Fig. 5 is a sectional view taken in the plane of line 5—5 of Fig. 4.

Referring to the drawing, Figs. 1 to 3 show my improved bracket as applied to a structural part of an aircraft such as a tubular strut A extending between different parts of an aircraft and exposed to the air stream, the streamline fairing for reducing the air resistance of the particular part of the air craft being indicated generally by the character B in all of the views. The tubular strut A is of the type generally used in aircraft construction and may be a landing gear or wing bracing strut, or other supporting or bracing member of the aircraft.

The improved bracket per se comprises a clamping ring 10 adapted to be secured to the strut A or other part of an aircraft, and a fairing supporting member 30 secured thereto and to the fairing B in a manner to be hereinafter more fully described. The clamping ring 10 may be a stock part or may be stamped from sheet material such as steel or other metal, the lugs 11 thereof having aligned openings for receiving a conventional fastening device such as the bolt 20 and nut 21 for clamping the ring securely to the strut A. The metal comprising the edges of the lugs 11 is pressed out to form the flanges 12, as best shown in Figs. 1 and 2, which serve to strengthen the lugs 11 and hold the same in position relative to the ends of the ring 10 so that the fastening 20, 21 may be tightened sufficiently to prevent the possibility of the ring becoming displaced with respect to the strut A.

The fairing supporting member 30 is preferably formed of a continuous strip of sheet metal such as steel, and is substantially U-shaped except for the indentations 31 at opposite sides of the member at points where the same is secured to the ring 10, which are so shaped as to conform to the shape of the clamping ring. Since it is contemplated that both the ring 10 and the member 30 will be made from the same material, the members are shown permanently joined together as at 32 and 33 by arc welding, although it is conceivable that spot welding or other process may be used successfully. The leading edge 34 of the member 30 is therefore permanently shaped to the streamline form desired while the opposite ends 35 and 36 of the member extend to the rear of the wing 10 to form the trailing edge of the member when the ends are secured together in the manner described below.

Figs. 3 to 5 of the drawing show in detail the manner of fastening the ends of the member 30 together and also of securing the fairing B to the bracket. The ends 35 and 36 of the member 30 are bent to lie against each other when drawn together while the trailing edge of the fairing B is pressed out to form a recess 40 or seat on one side for the head of the screw 41 and on the other side for the nut 42. The fairing B which in the usual case is light-weight sheet metal is bent around the supporting member 30 with sufficient tension to hold the leading edge and sides of the fairing in contact with points along the sides of the member 30, and is rigidly secured to the member by the fastening device 41, 42 which also serves to hold the ends 35 and 36 of the member 30 together, thereby giving the same the streamline shape required to support the fairing. In the modification shown in the drawing, studs 50 are shown secured to the member 30 at the point of contact of the leading edge of the fairing B, the function of which is to hold the forward part of the fairing while the same is being secured to the brackets. Such studs are not necessary, but if used, the leading edge of the fairing should be provided with suitable openings spaced to correspond with the position of the brackets on the member A for the reception of the studs.

Fig. 1 also shows in dotted lines, the clamping ring 10 and the fairing supporting member 30 with the fastenings removed and sprung apart in position for assembly or removing the bracket with respect to the strut A. Since the opening in the clamping ring 10 corresponds in direction with the opening between the ends 35 and 36 of the member 30 when the fastening devices are removed, the bracket may not only be readily applied to the strut A but the permanent fastening of the members by welding becomes feasible resulting in a stronger and more rigid structure. It is important to note that since the clamping ring 10 is strong enough to be clamped to the strut A so as to prevent any rotation or other displacement of the ring relative to the strut, that the fairing B is supported and its location is positively maintained with respect to the direction of the air flow past the part of the aircraft to which it is attached. This is also due to the fact that the member 30 is rigidly and permanently secured to the ring 10.

Attention is also called to the fact that no complicated parts enter into the construction of the bracket. The clamping ring 10 may be a stock item used for other purposes, the member 30 is simply a strip of sheet metal formed without waste from material used in the manufacture of other parts of the aircraft, and all of the fastening devices are standard fittings. No expensive process is used in the manufacturing or assembling of the parts so that a light-weight bracket strong enough to withstand all stresses imposed upon it is obtained at a low cost of manufacture which at the same time has many other advantages not to be found in previous types.

It is thought that a full understanding of my invention will be apparent from the above description. However, I wish it to be understood that although the modification shown represents an acceptable embodiment of my invention, I do not desire to be limited to the exact details shown and described for the reason that other modifications coming within the scope of the claims appended hereto will occur to persons skilled in the art.

I claim as my invention:

1. In a fairing bracket for use in aircraft construction, a clamping ring and a substantially U-shaped one-piece fairing supporting member having the rounded portion forming its leading edge and its free ends forming its trailing edge, said member secured to said clamping ring at points intermediate the leading and trailing edges of said member.

2. In a fairing bracket for use in aircraft construction, a split clamping ring and a substantially U-shaped one-piece member secured to the opposite sides thereof, the ends of said member extending to the rear of the sides of the ring approximately in the same direction as the opening in said clamping ring.

3. In a fairing bracket for use in aircraft construction, a split clamping ring and a substantially U-shaped one-piece member secured thereto, the open spreadable ends of said member extending beyond the sides of said clamping ring, the opening in said clamping ring being between the ends of said member.

4. In a fairing bracket for use in aircraft construction, a split clamping ring, a strap-like fairing supporting member secured to said clamping ring, said member having springable ends, means for clamping said ring to a structural part of an aircraft, and separate means for securing the ends of the fairing supporting member together, both said means being removable so the bracket may be sprung apart for attachment to a structural part of an aircraft.

5. In aircraft construction, a part of an aircraft exposed to the air flow, a streamline fairing having leading and trailing edges and adapted to reduce the air resistance of said part, a one-piece band-like member extending between the leading and trailing edges of said fairing, said member being so formed as to support both sides of said fairing at points intermediate the ends thereof, and means secured to opposite sides of said member for maintaining both said member and said fairing in alignment with respect to the air stream.

6. A fairing bracket for use in aircraft construction in which a continuous single band of sheet metal bent to the approximate shape of the streamline fairing to provide a support therefor is secured to the opposite sides of a clamping ring and to the leading and trailing edges of the fairing to prevent displacement thereof with respect to a part of an aircraft to which the clamping ring is attached.

7. In a fairing bracket for use in aircraft construction, a clamping ring, a one-piece fairing supporting member of a substantially U-shape, having the rounded portion forming its leading edge and its spreadable free ends forming its trailing edge, said member secured to said clamping ring at points intermediate the said leading and trailing edges, and means for securing the said free ends together.

8. In a fairing bracket for use in aircraft construction, a clamping ring, a one-piece band-like supporting member having spreadable trailing edge ends, said member completely encircling and attached to said clamping ring, and means for securing the ends of said member together to give the same a substantially streamlined contour.

9. In a fairing bracket for use in aircraft construction, a streamlined fairing adapted to reduce the air resistance of a part of aircraft, a one-piece band-like supporting member having spreadable ends, means for securing said member to the said part of an aircraft, and a means for simultaneously securing the ends of said member together and the said fairing to said member.

10. In aircraft, a one-piece streamlined fairing, a fairing supporting member having a similar streamlined shape with spreadable ends comprising its trailing edge, means for securing said member to a structural part of the aircraft, and means securing the ends of said member together to give the same substantially a streamlined contour, the last said means also serving to hold the fairing in contact with said supporting member at points intermediate its leading and trailing edges.

11. In aircraft, a fairing supporting member comprising a band bent flatwise to the direction of airflow, having a rounded portion for its leading edge and spreadable ends forming its trailing edge, a streamlined fairing, means for securing said member to a structural part of the aircraft, and means secured the ends of said member together to give the same substantially a streamlined contour, the last said means also serving to hold the fairing in contact with said supporting member at points intermediate its leading and trailing edges, and the first said means comprising a clamping ring which may be sprung apart for attachment to the structural part of the aircraft to which the said fairing is secured.

CHARLES E. HATHORN.